(12) United States Patent
Itagaki

(10) Patent No.: US 8,212,777 B2
(45) Date of Patent: Jul. 3, 2012

(54) NAVIGATION DEVICE WITH DUAL AIRFLOW SENSORS

(75) Inventor: Nobutaka Itagaki, Tokyo (JP)

(73) Assignee: Avago Technologies ECBU IP Pte. Ltd., Singapore (SG)

( * ) Notice: Subject to any disclaimer, the term of this patent is extended or adjusted under 35 U.S.C. 154(b) by 953 days.

(21) Appl. No.: 12/236,312

(22) Filed: Sep. 23, 2008

(65) Prior Publication Data

US 2010/0073293 A1 Mar. 25, 2010

(51) Int. Cl.
*G09G 5/08* (2006.01)
(52) U.S. Cl. .......................................... 345/166; 345/165
(58) Field of Classification Search .................. 345/163, 345/165, 166
See application file for complete search history.

(56) References Cited

U.S. PATENT DOCUMENTS

| 6,999,064 B2 * | 2/2006 | Park et al. ..................... 345/166 |
| 2004/0017357 A1 * | 1/2004 | Kinoshita et al. ............. 345/163 |

FOREIGN PATENT DOCUMENTS

JP 2001-249764 9/2001

OTHER PUBLICATIONS

Sasaki, S., Fujiwara, T., Nozoe, S., Sato, F., Imanaka, K., Sugiyama, S.; A Micromachined Thermal Flow Sensor Applied to a PC Mouse Device; Sensors, 2005 IEEE.

* cited by examiner

*Primary Examiner* — Kevin M Nguyen
*Assistant Examiner* — Sepideh Ghafari

(57) ABSTRACT

A navigation device with dual airflow sensors. The navigation device includes a first sensor to detect a first airflow in response to movement of the navigation device in approximately a first direction. The navigation device includes a second sensor to detect a second airflow in response to movement of the navigation device in approximately a second direction. The navigation device also includes first and second airflow directors which are aligned with the first and second sensors, respectively. Each airflow director includes multiple openings to direct the first and second airflows across the first and second sensors, and to maintain the first and second airflows substantially independent of one another. The navigation device also includes a microcontroller to generate a two dimensional navigation signal based on input signals from the first and second sensors.

20 Claims, 11 Drawing Sheets

NAVIGATION DEVICE WITH DUAL AIRFLOW SENSORS

BACKGROUND

Navigation devices may be used to interact with information on a computer screen through a GUI program to 'point,' 'click,' and 'drag' icons and other data. Navigation devices may also be used to move a pointer on a presentation screen or on a digital processor display such as a liquid crystal display. A conventional optical mouse has the ability to manipulate content on a presentation screen. However, a conventional optical mouse may prevent the presenter from giving a presentation independent of a desktop surface.

A conventional optical mouse does not work well on non-reflective or highly polished contact surfaces. For instance, a surface like black plastic laminate makes it difficult for an optical mouse to get high speed tracking. Inches per second, or IPS, represents the speed at which an optical mouse sensor can track accurately on a navigation surface without resulting in random cursor movements. For gamers, this is an important metric that represents the speed a gamer can move his mouse without the sensor losing tracking. The IPS performance of an optical mouse sensor is dependent on the reflectivity and uniformity of the surface being tracked. A conventional optical mouse that is optimized for high speed tracking usually lacks high resolution in the tracking.

SUMMARY

Embodiments of a navigation device are described. In one embodiment, the navigation device includes a first sensor to detect a first airflow in response to movement of the navigation device in approximately a first direction. The navigation device also includes a second sensor to detect a second airflow in response to movement of the navigation device in approximately a second direction. The second direction is substantially orthogonal to the first direction. The navigation device also includes first and second airflow directors which are aligned with the first and second sensors, respectively. Each airflow director includes a plurality of openings to direct the first and second airflows across the first and second sensors, respectively, and to maintain the first and second airflows substantially independent of one another. The navigation device also includes a microcontroller coupled to the first and second sensors. The microcontroller generates a two dimensional navigation signal based on input signals from the first and second sensors.

In another embodiment, the navigation device includes a body with a base. The base defines a first opening of a first cavity and a second opening of a second cavity in the navigation device. A first plate fits into the first cavity to define a first pair of opposing arcuate openings to direct a first airflow within the first cavity. The first pair of arcuate openings have points arranged adjacent a first common axis. A second plate fits into the second cavity to define a second pair of opposing arcuate openings to direct a second airflow within the second cavity in a direction substantially orthogonal to the first airflow. The second pair of arcuate openings have points arranged adjacent a second common axis orthogonal to the first common axis. A first sensor is disposed within the first cavity to detect the first airflow, and a second sensor is disposed within the second cavity to detect the second airflow. A surface contact sensor is disposed in the base approximately between the first opening and the second opening. The surface contact sensor determines whether the base is near a navigation surface. A microcontroller is coupled to the first and second sensors. The microcontroller generates a two dimensional navigation signal based on input signals from the first and second sensors. Other embodiments of the navigation device are also described.

Embodiments of a method are also described. In one embodiment, the method is a method of generating navigation signals. The method includes converting a first airflow measured across a first sensor into a first electrical parameter, and converting a second airflow measured across a second sensor into a second electrical parameter. The second airflow is measured orthogonally to the first airflow. The method also includes generating a first offset and a second offset in response to an offset trigger event. The method also includes generating a first navigation signal by subtracting the first offset from the first electrical parameter, and generating a second navigation signal by subtracting the second offset from the second electrical parameter. The first and second navigation signals together make up a two dimensional navigation signal.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
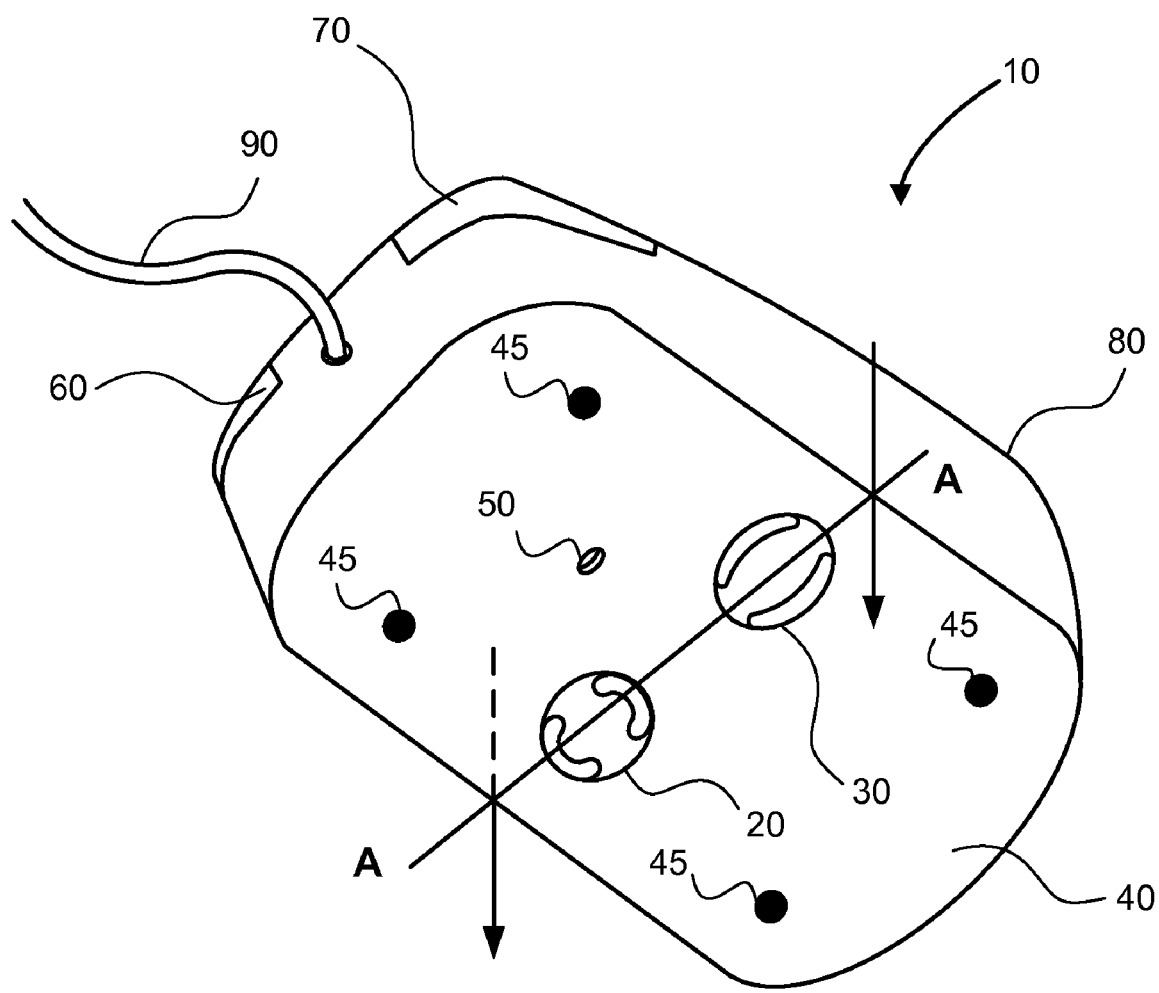
FIG. 1 depicts a perspective view of one embodiment of a navigation device.
Figure 2:
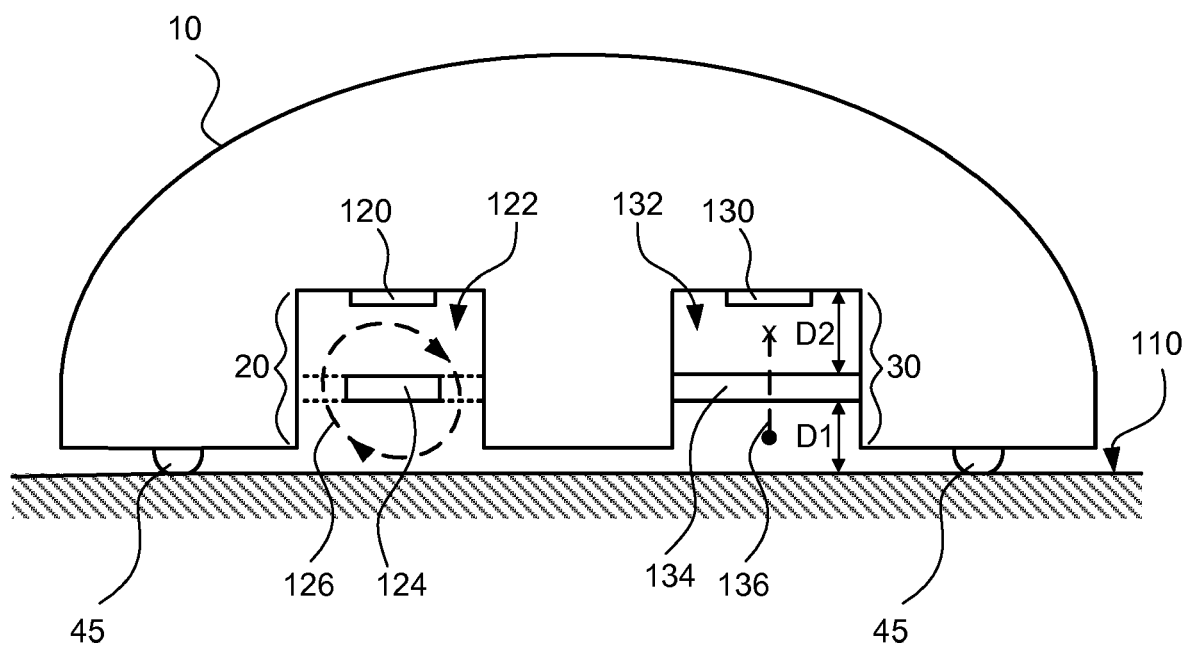
FIG. 2 depicts a cross-sectional view of the navigation device of FIG. 1 through the section A-A.

FIG. 1 is a perspective view of one embodiment of a navigation device 10. Refer to FIG. 2 for a cross-sectional view of the navigation device 10 through the section A-A. The navigation device 10 includes a first airflow director 20 and a second airflow director 30 within a base 40 of the navigation device 10. The base 40 of the navigation device 10 also includes multiple stand-offs 45. The navigation device 10 also includes a surface contact sensor 50 and multiple navigation buttons 60 and 70 in a housing 80 of the navigation device 10. The navigation device 10 further includes a cord 90 for communication with a host (not shown) such as a personal computer, a workstation, or a server. Other embodiments may omit the cord 90 and employ a different type of communication link such as a wireless communication link between the navigation device 10 and the host.

In general, the navigation device 10 generates a two dimensional navigation signal based on signals from separate components of a directional airflow corresponding to the first and second airflow directors 20 and 30. By using navigation signals dependent on airflow, rather than optical imaging, embodiments of the navigation device 10 can achieve relatively high tracking speeds independent of the type of navigation surface on which the navigation device 10 might be used. Additionally, using navigation signals dependent on the airflow, rather than optical imaging, allows embodiments of the navigation device 10 to be used in free space, in the absence of a navigation surface.

The base 40 of the navigation device 10 may be a base portion of a unibody structure with the housing 80. Alternatively, the base 40 may be a separate structure coupled to the housing 80 of the navigation device 10. In one embodiment, the base 40 includes the stand-offs 45 to allow the base 40 to operate at a predetermined distance from a navigation surface. The stand-offs 45 also may facilitate movement of the base 40 along a navigation surface. In an embodiment, when the stand-offs 45 are in contact with a navigation surface, the navigation device 10 is considered to be in contact with the navigation surface.

When the navigation device 10 is moved, either on a navigation surface or in the absence of a navigation surface, airflow may be created by the movement of the navigation device 10 against the inertia of the ambient air in and surrounding the navigation device 10. Relative to each of the airflow directors 20 and 30, the airflow may have corresponding vector components aligned with the first and second airflow directors 20 and 30. For example, the airflow may have a first component substantially aligned with the first airflow director 20 and a second component aligned with the second airflow director 30. The first airflow director 20 is designed to direct the first component of the airflow back and forth in substantially one direction within the airflow director 20. Similarly, the second airflow director 30 is designed to direct the second component of the airflow back and forth within the second airflow director 30 in substantially another direction. If the first and second airflow directors 20 and 20 are orthogonal relative to each other, then the first airflow director 20 facilitates detection of the first component along a first direction and the second airflow director 30 facilitates detection of the second component along a second direction that is substantially orthogonal relative to the first direction. Therefore, independent and orthogonal airflow components are detected from any two dimensional movement of the navigation device 10. By measuring independent and orthogonal airflow components, sensors (refer to FIG. 2) associated with the airflow directors 20 and 30 can accurately detect relatively small amounts of movements of the navigation device 10 since there is no interference of one airflow with the other airflow.

Although the first and second airflow directors 20 and 30 are shown and described in the base of the navigation device 10, alternative embodiments of the navigation device 10 may be implemented with one or both of the airflow directors 20 and 30 on another surface of the navigation device 10. For example, some embodiments of the navigation device 10 include at least one of the airflow directors 20 and 30 on the housing 80, rather than the base 40.

In an embodiment, the surface contact sensor 50 is disposed in the base 40 of the navigation device 10 between the first airflow director 20 and the second airflow director 30. The surface contact sensor 50 determines when the base 40 is near a navigation surface. In some embodiments, the base 40 is near a navigation surface when the stand-offs 45 are in contact with, or within a few millimeters of, the navigation surface. Although the surface contact sensor 50 is shown and described in the base 40 of the navigation device 10, other embodiments of the navigation device 10 may implement the surface contact sensor 50 on another part of the navigation device intended to make contact with a navigation surface. Additionally, some embodiments of the navigation device 10 may locate the surface contact sensor 50 in another location on the base 40 of the navigation device 40 so that the surface contact sensor is not between the first and second airflow directors 20 and 30. In response to the navigation device 10 being lifted from a navigation surface, the surface contact sensor 50 detects that the base 40 is not near a navigation surface. In some embodiments, the navigation device 10 sends navigation signals to the host only while the surface contact sensor 50 indicates the base 40 is near a navigation surface. Therefore, while the navigation device 10 is away from the navigation surface, no navigation signals are sent from the navigation device 10 to the host. This allows a repositioning of the navigation device 10, for example, while maintaining a cursor in a GUI at its present location.

The navigation buttons 60 and 70 may have multiple functions. In addition to implementing conventional functionality using the navigation buttons 60 and 70, in one embodiment, simultaneously depressing the buttons 60 and 70 triggers a normalization of the navigation signals, in some embodiments. Normalization of the navigation signals is explained below in detail with reference to FIG. 8. Other embodiments of the navigation device 10 may use other functionality to trigger normalization of the navigation signals.

FIG. 2 depicts a cross-sectional view of the navigation device 10 of FIG. 1 through the section A-A. In general, the cross-sectional view of the navigation device 10 illustrates the navigation device 10 in contact (via the stand-offs 45) with a navigation surface 110. In some embodiments, the stand-offs 45 position the navigation device 10 above the contact surface 110 so as to enable airflow between the navigation device 10 and the contact surface 110.

The cross-sectional view of the navigation device 10 also illustrates further details of the first and second airflow directors 20 and 30. The airflow directors 20 and 30 include structures to define airflow cavities 122 and 132, as well as plates 124 and 134 within the corresponding cavity 122 and 132. Sensors 120 and 130 are located within the cavities 122 and 132 to detect airflow within or through the cavities 122 and 132.

In particular, the navigation device 10 includes a first sensor 120 disposed in the first cavity 122 and a second sensor 130 disposed in the second cavity 132. The navigation device 10 also includes the first plate 124 within the first cavity 122 and the second plate 134 within the second cavity 132. Thus, the first airflow director 20 includes the first cavity 122 and the first plate 124. Together, the first cavity 122 and the first plate 124 direct a first airflow 126 (i.e., a first component of an airflow) past the first sensor 120. Similarly, the second airflow director 30 includes the second cavity 132 and the second plate 134. Together, the second cavity 132 and the second plate 134 direct a second airflow 136 (i.e., a second component of an airflow) past the second sensor 130. For convenience, references herein to the first airflow 126 and the second airflow 136 may refer to corresponding first and second components of a single airflow. In one embodiment, first and second plates 124 and 134 are arranged orthogonally relative to each other so that the second airflow 136 is orthogonal to the first airflow 126. Since the first and second sensors 120 and 130 detect separate airflows, outputs from the first and second sensors 120 and 130 may be independently processed. While some embodiments of the navigation device 10 may be implemented to detect orthogonal airflows, or airflow components, within separate cavities 122 and 132, other embodiments may use multiple sensors within a single cavity. However, it should be noted that detecting multiple orthogonal airflows, or airflow components, within a single cavity may result in interfering airflows, which may influence the signals obtained by the sensors.

The ability of the sensors 120 and 130 to detect movement of the navigation device is influenced by the design of the cavities 122 and 132. In some embodiments, the cavities 122 and 132 are designed to maximize the airflow near the sensors 120 and 130. In order to enhance the airflow, the plates 124 and 134 may be located at specific depths within the cavities 122 and 132. The distance from the bottom of the plates 124 and 134 to about the navigation surface 110 is designated as D1. The dimension D1 is influenced by the thickness of the plates 124 and 134 and the stand-offs 45. The distance from the top of the plates 124 and 134 to about the top surface (i.e., where the sensors 120 and 130 are mounted) of the cavities 122 and 132 is designated as D2. The dimension D2 is influenced by the thickness of the plates 124 and 134 and the depth of the cavities 122 and 132. The plate thickness may range from 0.25 mm to 0.75 mm and, in some embodiments, may be about 0.5 mm. D1 may range from approximately 0.5 mm to 1.4 mm and, in some embodiments, may be about 0.9 mm. D2 may range from approximately 0.8 mm to 1.8 mm and, in some embodiments, may be about 1.3 mm. Other embodiments may use other dimensions. Additionally, some embodiments may implement different dimensions for the separate cavities 122 and 134 and corresponding plates 124 and 134.

Figure 3:
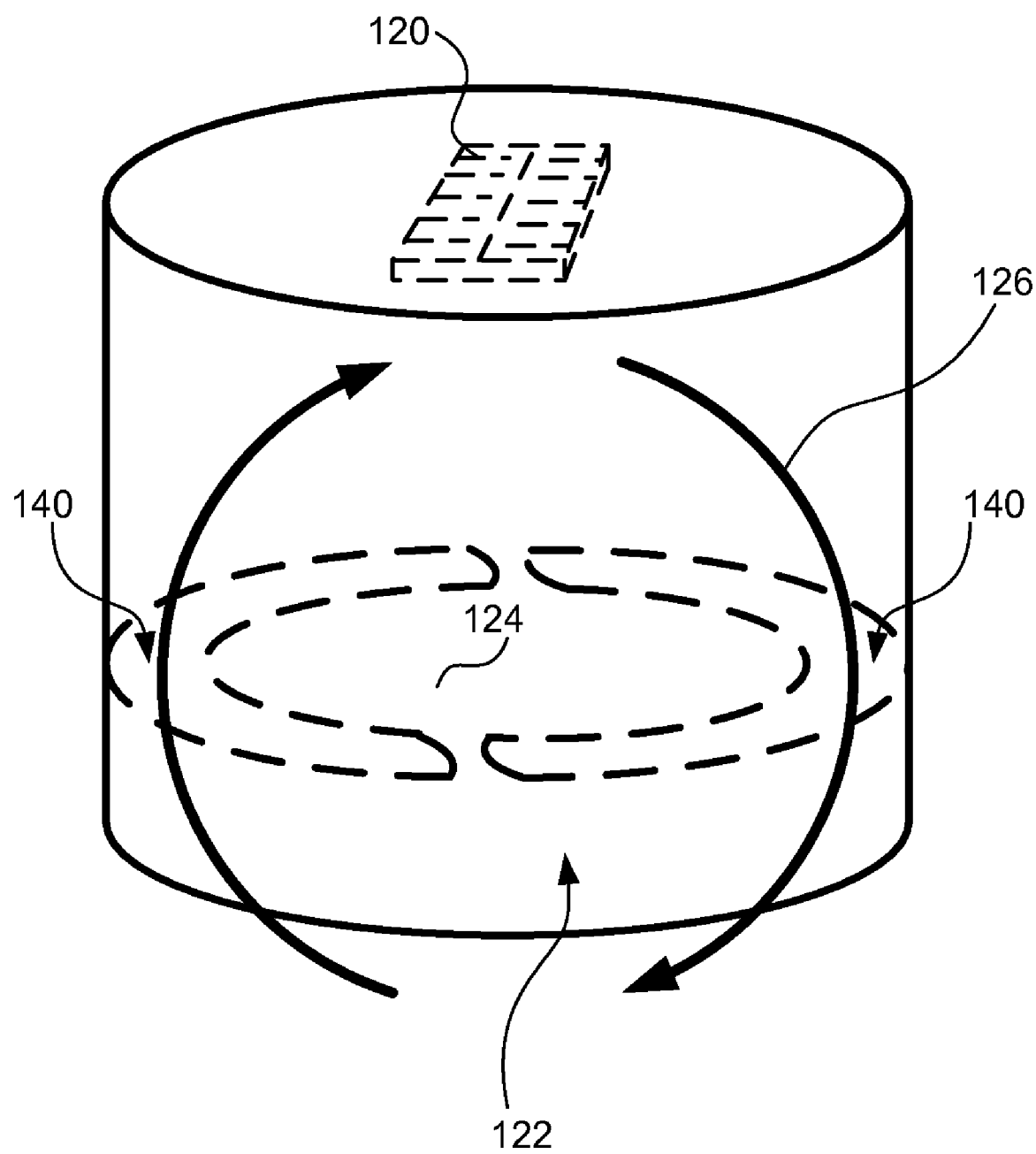
FIG. 3 depicts a perspective view of one embodiment of the first airflow director of the navigation device of FIG. 1.

FIG. 3 depicts a perspective view of one embodiment of the first airflow director 20 of the navigation device 10 of FIG. 1. The first airflow director 20 includes the first plate 124, the walls of the first cavity 122, and the top surface of the first cavity 122. In one embodiment, the first sensor 120 is disposed at the top of the first cavity 122, as explained above. The first sensor 120 is aligned to detect the first airflow 126 (the component shown by the counter-clockwise arrows) within the first airflow director 20.

The airflow director plate 124 includes arcuate openings 140 (shown as dashed lines) to direct the airflow 126 across the sensor 120 in the cavity 122. In particular, the airflow 126 enters through one of the arcuate openings 140 and exits through the other arcuate opening 140. The airflow 126 through the cavity 122 results from movement of the navigation device 10. The direction of the airflow 126 through the cavity 122 may depend on the direction of movement of the navigation device 10. In some embodiments, the airflow director plate 124 also serves to protect the sensor 120 from debris and from damage due to inadvertent human interaction.

In some embodiment, the second airflow director plate 134 (shown in FIG. 2) is substantially similar to the first airflow director plate 124, except that the second airflow director plate 134 is oriented substantially orthogonal to the first airflow director plate 124. More specifically, the openings defined by the second airflow director plate 134 cause the second airflow 136 to pass the second sensor 130 in a direction that is substantially orthogonal to the direction of the first airflow 126 past the first sensor 120. Since the second airflow director 134 is oriented orthogonally to the first airflow detector 124, the first and second sensors 120 and 130 are each capable of detecting airflow components in orthogonal directions corresponding to independent axes of movement of the navigation device 10. Although the walls of the cavity 122 are shown to define a substantially circular opening, or cylindrical cavity, other embodiments may define other shapes of cavities. In embodiments where the first and second cavities 122 and 132 and the first and second plates 124 and 134 are substantially circular, the radius of the first and second plates 124, and 134 is approximately 1.5 mm to 2.5 mm less than the radius of the first and second cavities 122 and 132 so as to define the openings 140 between the respective cavity 122 and 132 and the first and second plates 124 and 134. In some embodiments, the radius of the cavity 122 may be approximately 2.5 mm to 7.5 mm.

Figure 4A:
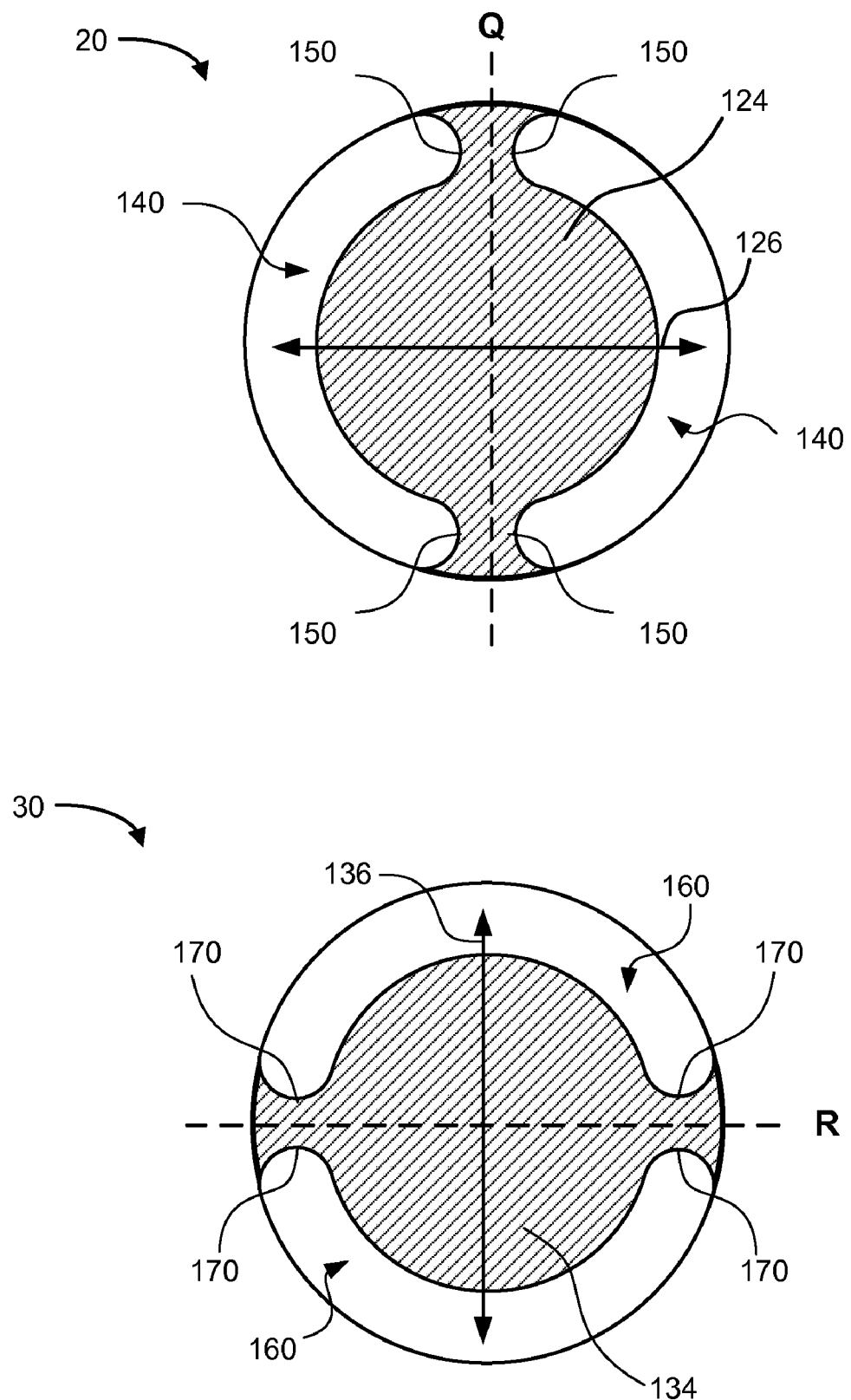
FIG. 4A depicts a bottom view of one embodiment of the first and second airflow directors of the navigation device of FIG. 1.

FIG. 4A depicts a bottom view of one embodiment of the first and second airflow directors 20 and 30 of the navigation device 10 of FIG. 1. In particular, the first plate 124 fits into the first cavity 122 to form the two opposing arcuate openings 140. The arcuate openings 140 have points 150 arranged adjacent a first common axis Q. As described above, the arcuate openings 140 direct and isolate the first airflow 126 through the first cavity 122 between the arcuate openings 140, in a direction substantially perpendicular to the first common axis Q.

Similarly, the second plate 134 fits into the second cavity 132 to form two opposing arcuate openings 160. The arcuate openings 160 have points 170 arranged adjacent a second common axis R orthogonal to the first common axis Q. The arcuate openings 160 defined by the second plate 134 direct and isolate the second airflow 136 through the second cavity 132 between the arcuate openings 160 in a direction that is substantially orthogonal to the first airflow 126. When the navigation device 10 moves in a direction back and forth parallel with the axis R, the first airflow 126 in and out of the openings 140 is substantially parallel to the axis R. However, with the same movement of the navigation device 10 substantially parallel to the axis R, the second airflow 136 in and out of the openings 160 is marginal. Likewise, for a movement of the navigation device 10 in a direction back and forth parallel to the axis Q, the second airflow 136 in and out of the openings 160 is substantially parallel to the axis R, and the first airflow 126 in and out of the openings 140 is limited.

Figure 4B:
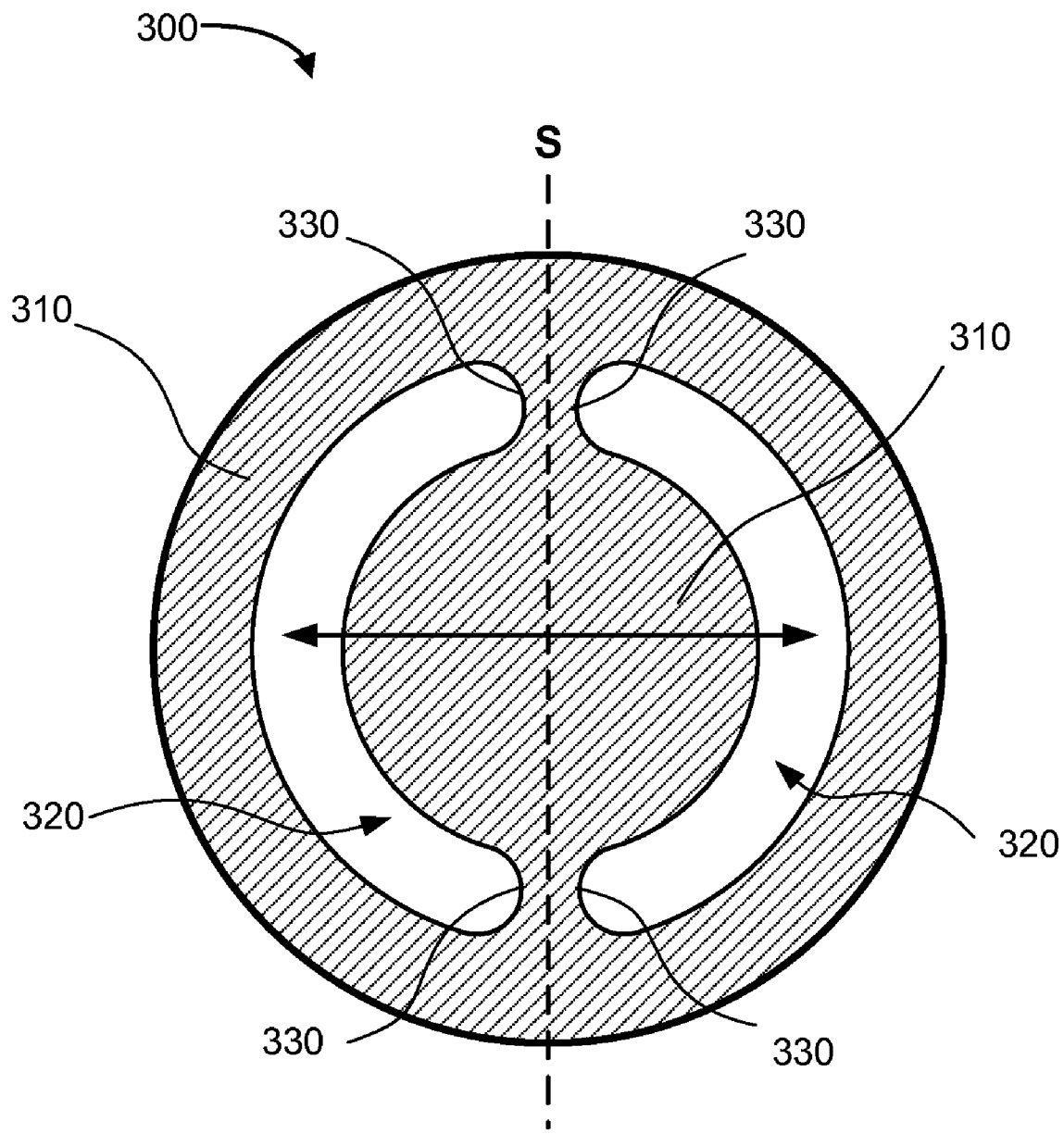
FIG. 4B depicts a bottom view of an alternative embodiment of an airflow director of the navigation device of FIG. 1.

FIG. 4B depicts a bottom view of an alternative airflow director 300 of the navigation device 10 of FIG. 1. In this embodiment, the airflow director plate 310 defines two opposing arcuate openings 320 independent of the walls of the cavity into which the airflow director plate 310 is placed and fixed. The arcuate openings 320 of the plate 310 have points 330 adjacent a first common axis S. Other arcuate shaped openings in the first and second plates may accomplish substantially the same function to direct and isolate airflow across the first and second sensors, respectively.

Figure 5:
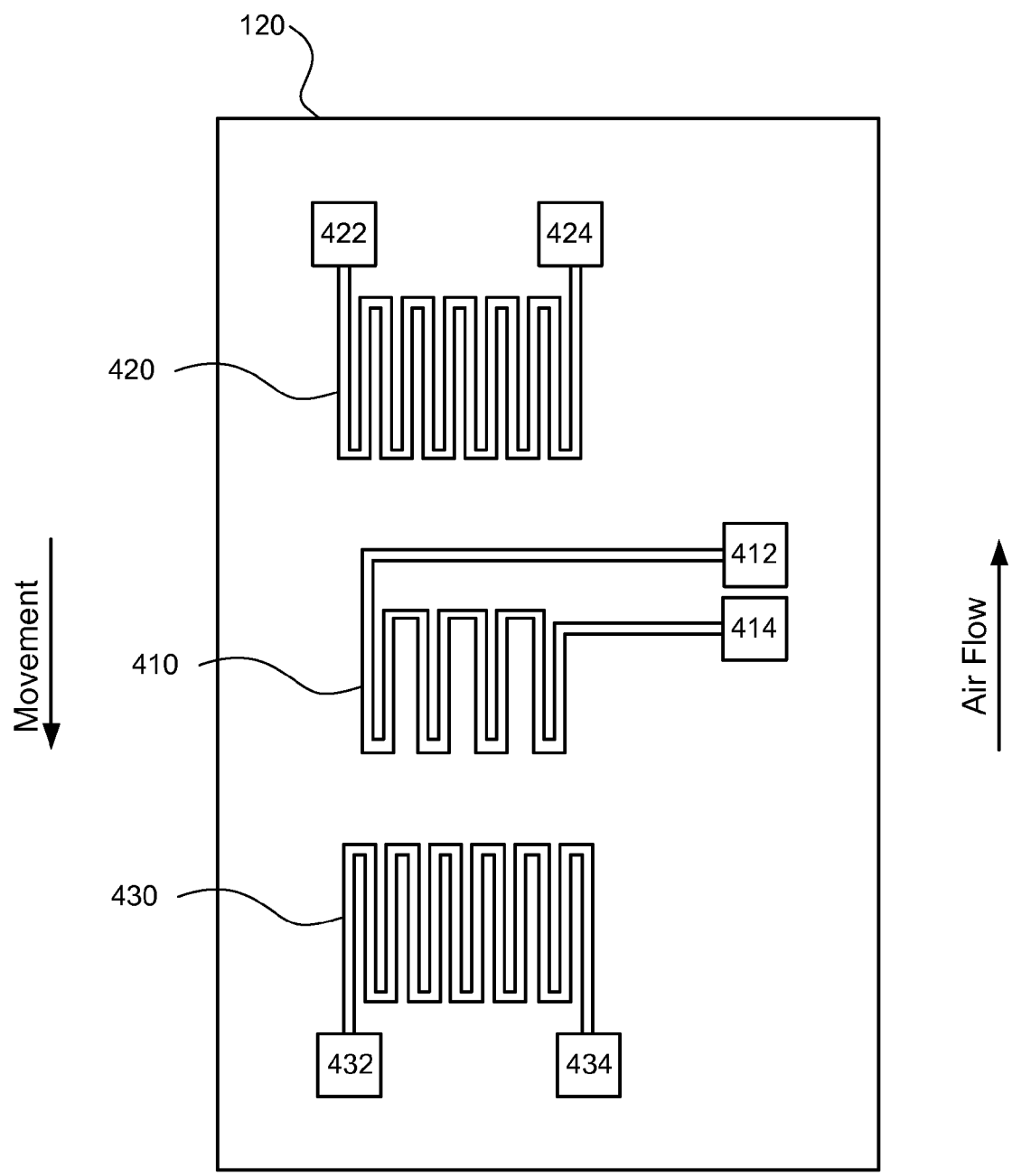
FIG. 5 depicts a schematic diagram of one embodiment of the first airflow sensor of the navigation device of FIG. 1.

FIG. 5 depicts a schematic diagram of one embodiment of the first airflow sensor 120 of the navigation device 10 of FIG. 1. The illustrated sensor 120 includes a heater 410 and a pair of thermopiles 420 and 430. The heater 410 is bonded to corresponding bonding pads 412 and 414 for integration with other components within the navigation device 10. Likewise, the first thermopile 420 is bonded to bonding pads 422 and 424, and the second thermopile 430 is bonded to bonding pads 432 and 434. Any suitable type of bonding pads, wire leads, electrodes, or other connection points may be used to connect the heater 410 and thermopiles 420 and 430 to the body of the sensor 120, depending on the scale of integration and the size of the navigation device 10. Each pair of thermopiles 420 and 430 is configured to generate an airflow signal based on a temperature difference in the air across the pair of thermopiles 420 and 430. According to the direction of airflow shown in the figure, the first thermopile 420 is upstream of the heater 410 and the second thermopile 430 is downstream from the heater 410. Alternatively, the direction of the airflow may be the other direction. The direction of the airflow depends, at least in part, on the direction of movement of the navigation device 10.

When the navigation device 10 is at rest, the heater 410 heats the air adjacent to the heater 410, while the temperature of the air adjacent to the upstream thermopile 420 is relatively the same as the temperature of the air adjacent to the downstream thermopile 430. However, when the navigation device 10 moves, for example, in the direction depicted, the upstream thermopile 420 moves toward the heated air due to the inertia of the heated air to remain substantially at rest. In other words, the movement of the navigation device 10 causes an airflow relative to the heater 410 and the pair of thermopiles 420 and 430. Therefore, there is a temperature difference between the temperature of the air adjacent to the upstream thermopile 420 and the temperature of the air adjacent to the downstream thermopile 430. This temperature difference causes the upstream thermopile 420 to have electrical characteristics different from the electrical characteristics of the downstream thermopile 430. The resulting difference in electrical characteristics enables the creation of a corresponding airflow signal. In some embodiments, the airflow signal can be analyzed to determine a magnitude and/or direction of the movement of the navigation device 10.

The sensors 120 and 130 are oriented within the corresponding cavities 122 and 132 such that the thermopiles in the sensors 120 and 130 are aligned with the airflow directors 20 and 30 and the airflow generated by the airflow directors 20 and 30.

Though FIG. 5 depicts a sensor able to sense movement in one dimension either upstream or downstream from the heater 410, two dimensional sensors which have two pairs of thermopiles may be used in other embodiments. However, using separate one dimensional sensors in separate cavities (i.e., separating the first sensor 120 from the second sensor 130 in respective cavities 122 and 132) prevents cross heating of the first and second airflows 126 and 136. Such cross heating could potentially degrade the resulting airflow signals. Additionally, putting thermopile pairs across a single heater within a cavity prevents excessive heat buildup in the cavity and, thus, allows the sensors 120 and 130 to detect smaller movements in the navigation device 10. In some embodiments, using one dimensional sensors in separate cavities also enables faster detection of movements of the navigation device 10.

Figure 6:
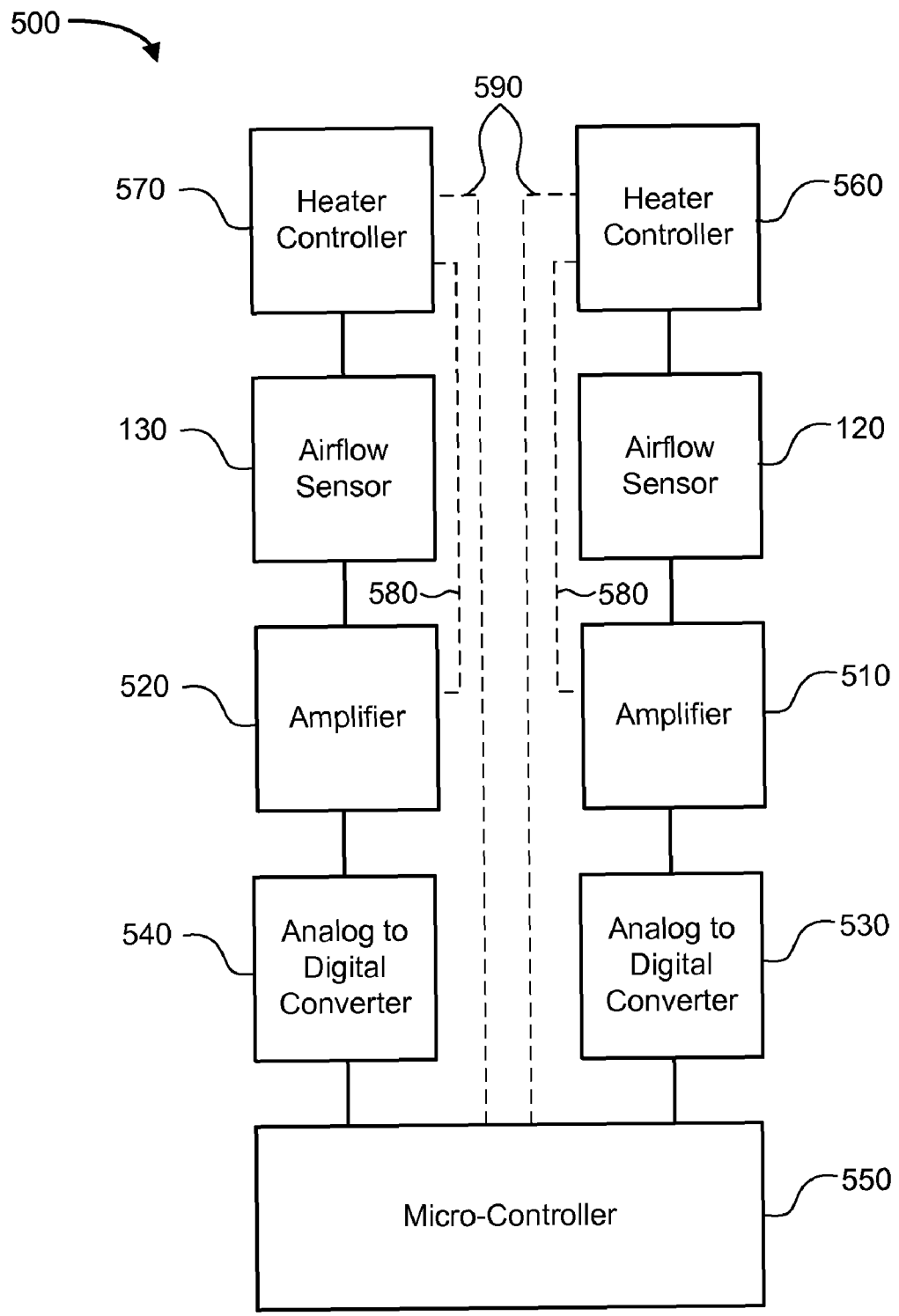
FIG. 6 depicts a schematic block diagram of one embodiment of circuitry within the navigation device of FIG. 1.

FIG. 6 depicts a schematic block diagram of one embodiment of circuitry 500 within the navigation device 10 of FIG. 1. The illustrated circuitry 500 includes the airflow sensors 120 and 130 with corresponding amplifiers 510 and 520 and analog to digital converters (ADCs) 530 and 540. The circuitry 500 also includes heater controllers 560 and 570 coupled to the airflow sensors 120 and 130. The circuitry 500 also includes a microcontroller 550.

The first and second amplifiers 510 and 520 amplify the airflow signals from the first sensor 120 and the second sensor 130, respectively. In some embodiments, the amplifiers 510 and 520 also supply current and/or voltage to the sensors 120 and 130. Alternatively, another component such as a navigation device power supply (not shown) may supply electrical current and/or voltage to the sensors 120 and 130, for example, through a power bus integrated into the navigation device 10.

The first ADC 530 generates a digital signal of the amplified airflow signal from the first amplifier 510. Similarly, the second ADC 540 generates a digital signal of the amplified airflow signal from the second amplifier 520. The microcontroller 550 receives the digital signals from the first ADC 530 and the second ADC 540 and generates a two dimensional navigation signal based on the digital signals from the first ADC 530 and the second ADC 540.

In an embodiment, each heater controller 560 and 570 controls current into respective heaters within the airflow sensors 120 and 130. In some embodiments, the heater controllers 560 and 570 adjust the heater temperatures in response to a change in movement speed of the navigation device 10. The heater controllers 560 and 570 may operate according to control signals received from the amplifiers 510 and 520 (indicated by the dashed control lines 580). Alternatively, the heater controllers 560 and 570 may operate according to control signals received from the microcontroller 550 (indicated by the dashed control lines 590). Other embodiments may use other control mechanisms to control the heater controllers 560 and 570. The microcontroller 550 is programmed and/or configured, in an embodiment, to normalize the two dimensional navigation signal by removing an offset from each signal. The offset is determined in response to an offset trigger event. In one embodiment, the offset trigger event occurs at initial power on state while the navigation device 10 is at rest. In another embodiment, the offset trigger event occurs when a plurality of navigation device buttons (e.g., the left and right buttons on a conventional mouse) are simultaneously depressed.

Figure 7A:
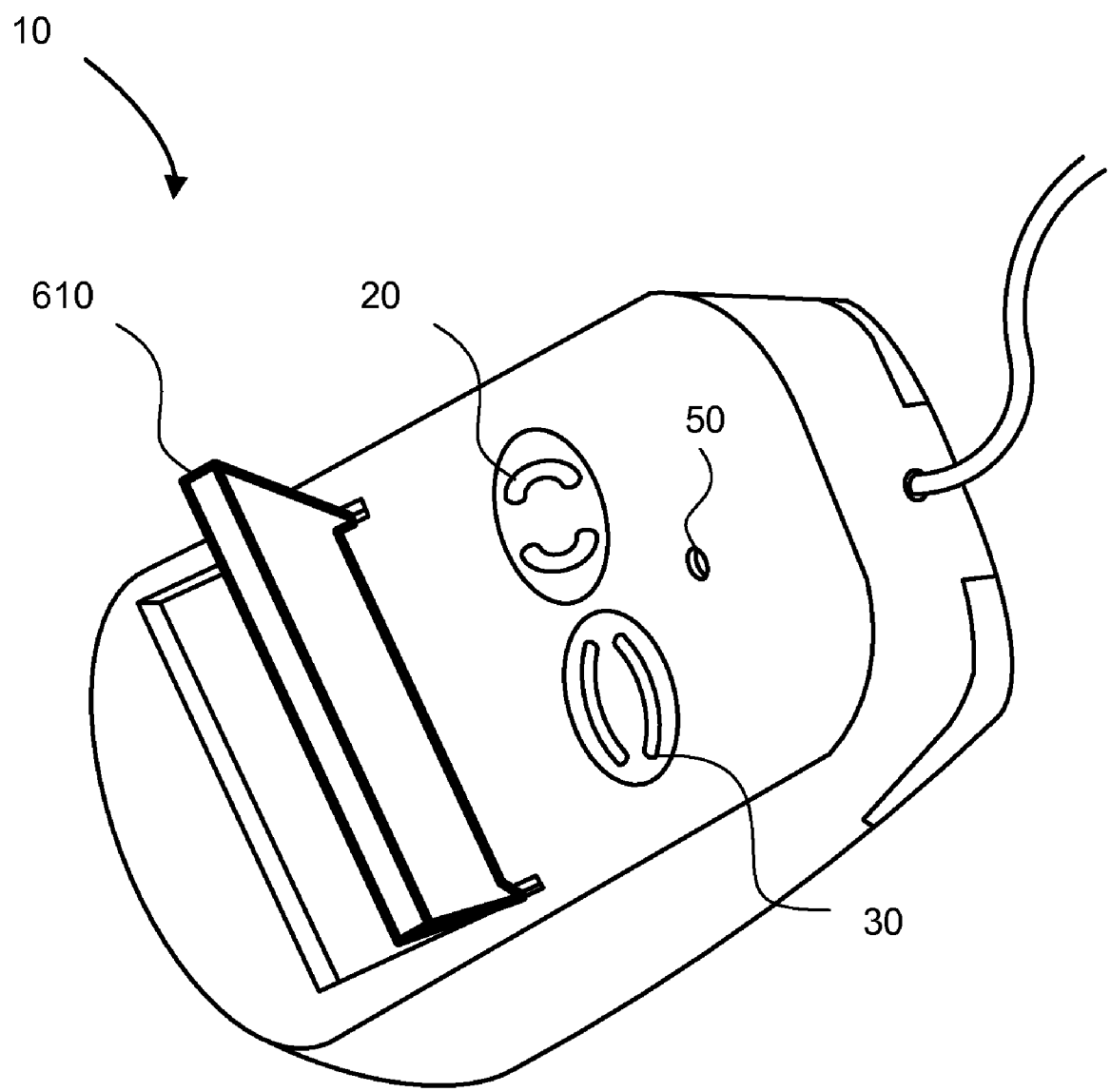
FIG. 7A depicts a perspective view of another embodiment of a navigation device including a switching plate.

FIG. 7A depicts a perspective view of another embodiment of the navigation device 10 including a switching plate 610. The switching plate 610 is coupled to the base 40 of the navigation device 10. The switching plate 610 is configured to extend across the first and second airflow directors 20 and 30 and to extend proximal to the surface contact sensor 50 to enable the navigation device 10 to be used as a presentation pointer independent of the navigation surface. The switching plate 610 simulates the effect of the navigation surface.

Figure 7B:
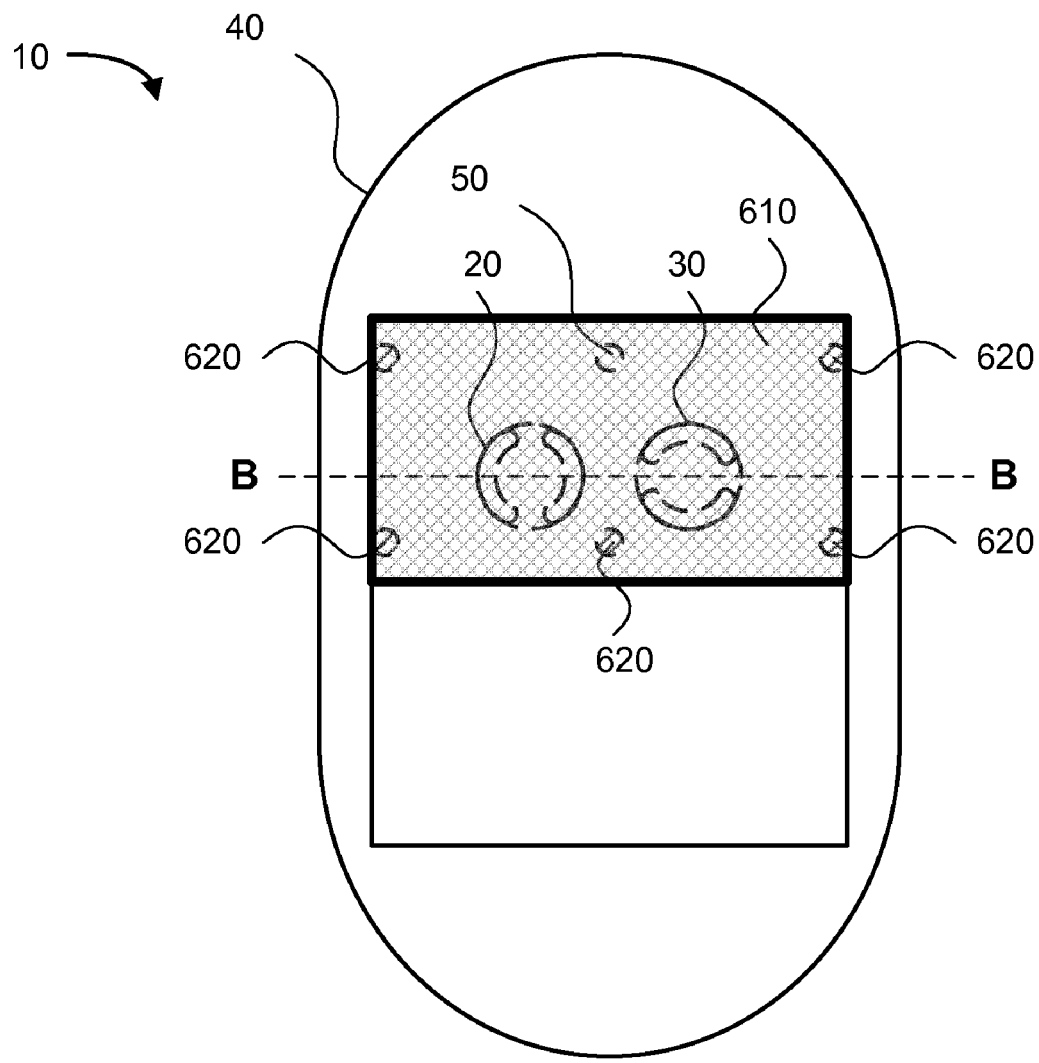
FIG. 7B depicts a bottom view of the navigation device of FIG. 7A in which the switching plate is extended over the airflow directors.

FIG. 7B depicts a bottom view of the navigation device 10 of FIG. 7A in which the switching plate 610 (shown with a hatch pattern) is extended over the airflow directors 20 and 30. The switching plate 610 not only enables the navigation device 10 to function as if it were placed on the navigation surface, but also simulates the airflow effects as if the navigation device 10 were placed on the navigation surface. One or more stand-off structures 620 are placed in the base 40 of the navigation device 10 to be adjacent the switching plate 610 while the switching plate 610 is extended to cover the airflow directors 20 and 30, as shown.

Figure 7C:
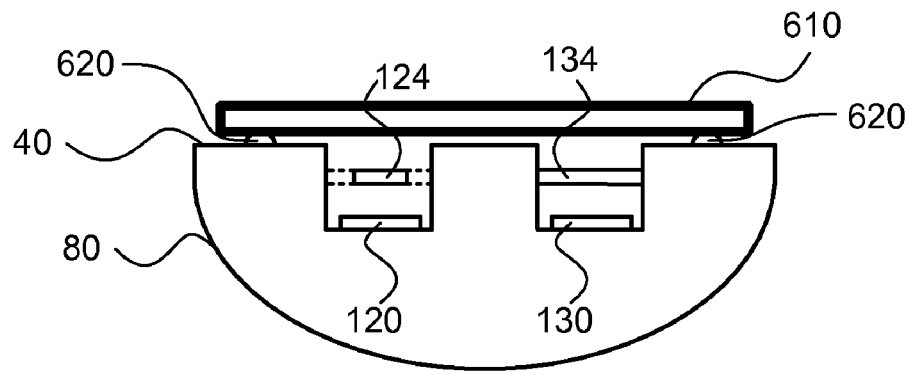
FIG. 7C depicts a cross-sectional view of the navigation device of FIG. 7B through the section B-B.

FIG. 7C depicts a cross-sectional view of the navigation device 10 of FIG. 7B through the section B-B. In one embodiment, the elastic stand-off structures 620 enable the switching plate 610 to be depressed as a switch to enable or disable the navigation device 10 as a presentation pointer. The switching plate 610 enables the navigation device 10 to be a presentation pointer by virtue of the switching plate 610 coming into and going out of the range of the surface contact sensor 50. In other words, when the surface contact sensor 50 detects the switching plate 610 within a specified proximity of the base 40 of the navigation device, the surface contact sensor enables the navigation device to output navigation signals to control a cursor or other indicator on a presentation screen. In this way, the switching plate 610 mimics a stationary navigation surface, and the surface contact sensor 50 simply enables the navigation signals to detect the switching plate 610 in the extended position near the surface contact sensor 50. When the switching plate 610 is released, the switching plate 610 may move away from the base 40, and outside of the detecting proximity of the surface contact sensor 50, so that the navigation signals are disabled. In one embodiment, the switching plate 610 moves away from the base 40, in the absence of pressure from a user, through an elastic force from the stand-off structures 620. Other embodiments may use other mechanisms to force the switching plate 610 away from the base 40 in the absence of pressure from a user.

Figure 8:
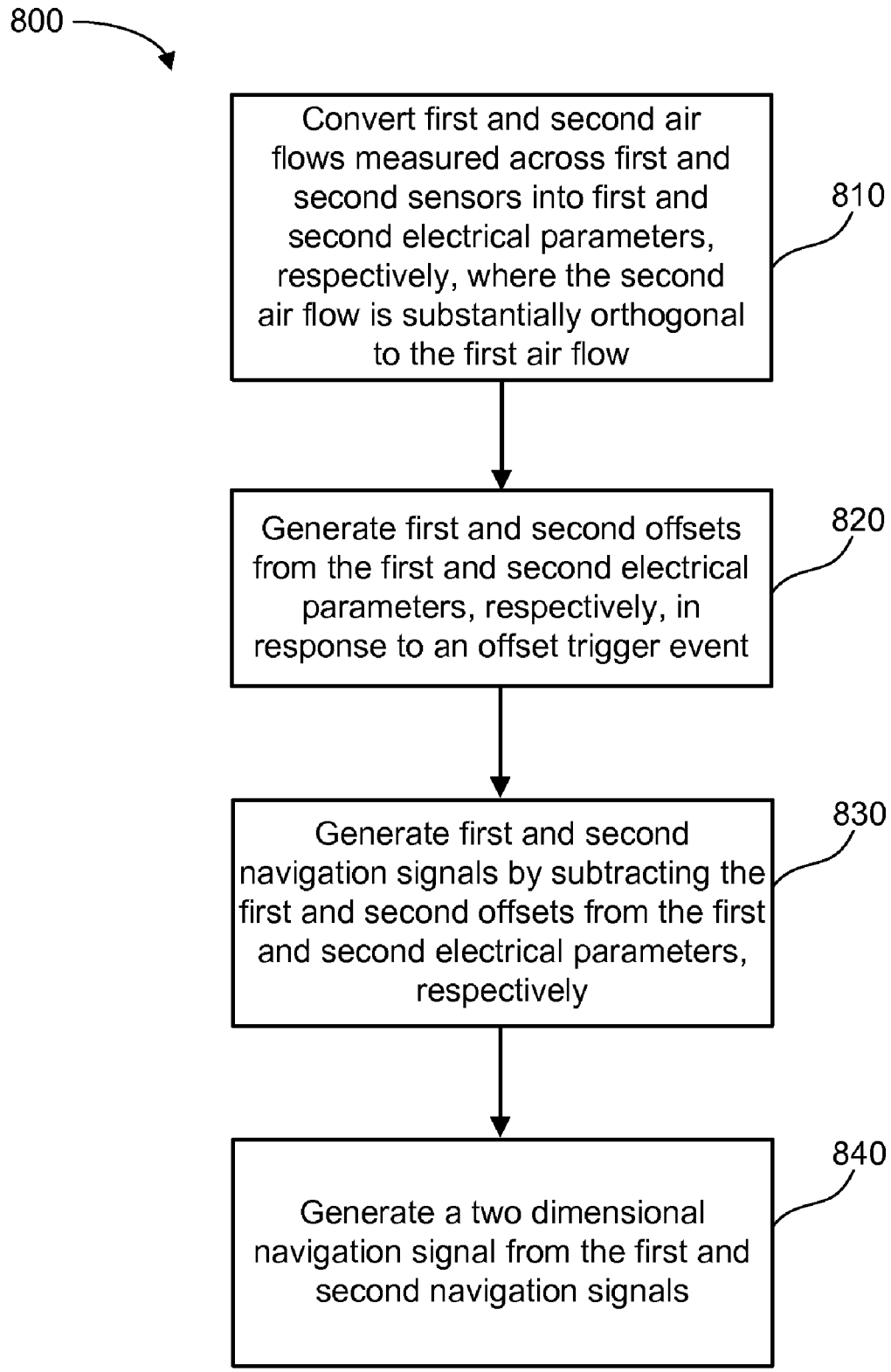
FIG. 8 depicts a flow chart diagram of one embodiment of a method for generating navigation signals using the navigation device of FIG. 1.

FIG. 8 depicts a flow chart diagram of one embodiment of a method 800 for generating navigation signals using the navigation device 10 of FIG. 1. At block 810 of the depicted method 800, the first and second sensors 120 and 130 convert the first and second airflows into first and second electrical parameters. As described above, the second airflow is measured orthogonally relative to the first airflow. The electrical parameters may include current, voltage, charge, resistance, impedance, capacitance, inductance, or another electrical characteristic.

At block 820, the microprocessor 550 generates first and second offsets in response to an offset trigger event. At block 830, the microprocessor 550 generates one dimensional navigation signals by subtracting the first offset from the first electrical parameter and by subtracting the second offset from the second electrical parameter. At block 840, the microprocessor 550 generates a two dimensional navigation signal form the first and second one dimensional navigation signals. The depicted method 800 then ends.

Figure 9:
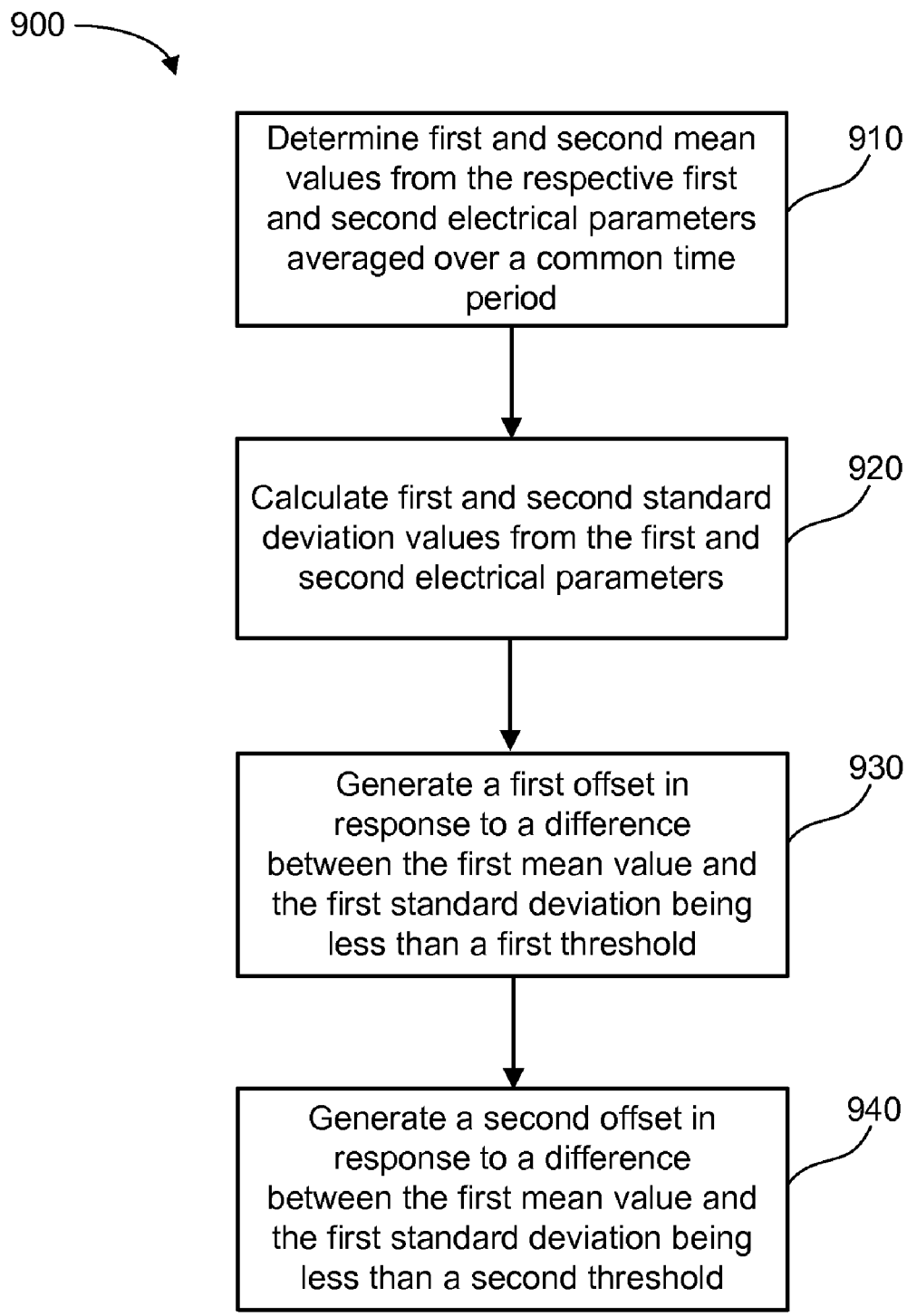
FIG. 9 depicts a flow chart diagram of one embodiment of a method for generating offset values.

FIG. 9 depicts a flow chart diagram of one embodiment of a method 900 for generating offset values. The method 900 may be used to determine the first offset and the second offset, for example, while the navigation device 10 is at rest. At block 910, the microprocessor 550 determines a first mean value from the first electrical parameter averaged over a first time period. The microprocessor 550 performs similar operations to determine a second mean value from the second electrical parameter averaged over a second time period common with the first time period. The first time period and the second time period may be determined by the inverse of the sampling rate of an analog-to-digital converter. At block 920, the microprocessor 550 calculates a first standard deviation from multiple first electrical parameters and calculating a second standard deviation from multiple second electrical parameters. At block 930, the microprocessor 550 generates the first offset when a difference between the first mean value and the first standard deviation is less than a first threshold stored in a microcontroller memory (not shown). At block 940, the microprocessor 550 generates the second offset when a difference between the second mean value and the second standard deviation is greater than a second threshold also stored in the microcontroller memory. The depicted method 900 then ends.

As explained above, the microprocessor 550 may use the generated offsets to normalize the one dimensional navigation signals independently derived from the sensors 120 and 130. Additionally, the offsets may be used to normalize a two dimensional signal. In some embodiments, normalizing one or more of the navigation signals may include multiplying the navigation signal(s) by a coefficient stored in the microcontroller memory. The coefficient may be variable in response to a change in movement speed of the navigation device 10. The coefficient therefore may approximate a linear response necessary for consistent performance from a lower speed to a higher speed of the navigation device 10.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A navigation device, comprising:
 a first sensor configured to detect a first airflow in response to movement of the navigation device in approximately a first direction;
 a second sensor to detect a second airflow in response to movement of the navigation device in approximately a second direction, wherein the second direction is substantially orthogonal to the first direction;
 first and second airflow director plates aligned with the first and second sensors, respectively;
 a first plurality of openings extending through the first airflow director plate to direct the first airflow through the first plurality of openings and across the first sensor;
 a second plurality of openings extending through the second airflow director plate to direct the second airflow through the second plurality of openings and across the second sensor,
 wherein the first plurality of openings extending through the first airflow director plate and the second plurality of openings extending through the second airflow plate are arranged to maintain the first and second airflows substantially independent of one another; and
 a microcontroller coupled to the first and second sensors, the microcontroller to generate a two dimensional navigation signal based on input signals from the first and second sensors.

2. The navigation device of claim 1, wherein the microcontroller is further configured to normalize the two dimensional navigation signal by removing an offset from at least one of the input signals.

3. The navigation device of claim 1, further comprising a body comprising a base, the base defining a first opening of a first cavity and a second opening of a second cavity in the navigation device, wherein the first sensor is disposed within the first cavity and the second sensor is disposed within the second cavity.

4. The navigation device of claim 3, wherein:
 the first airflow director plate is configured to be received into the first cavity;
 the first plurality of openings extending through the first airflow director plate comprises a first pair of opposing arcuate openings to direct the first airflow within the first cavity, the first pair of arcuate openings having points arranged adjacent a first common axis;
 the second airflow director plate is configured to be received into the second cavity; and
 the second plurality of openings extending through the second airflow director plate comprises a second pair of opposing arcuate openings to direct the second airflow within the second cavity in a direction substantially orthogonal to the first airflow, the second pair of arcuate openings having points arranged adjacent a second common axis orthogonal to the first common axis.

5. The navigation device of claim 4, wherein the first and second airflow director plates are located: a first distance of approximately 0.5 mm to 1.4 mm from a navigation surface adjacent the base, measured to bottom surfaces of the first and second airflow director plates received within the respective first and second cavities; and a second distance of approximately 0.8 mm to 1.8 mm to top surfaces of the respective first and second cavities, measured from top surfaces of the first and second airflow director plates received within the respective first and second cavities.

6. The navigation device of claim 4, wherein the first and second cavities and the first and second airflow director plates are substantially circular, wherein a radius of the first and second airflow director plates is approximately 1.5 mm to 2.5 mm less than a radius of the first and second cavities.

7. The navigation device of claim 1, wherein each of the first and second sensors comprises: a heater; a pair of thermopiles, wherein each pair of thermopiles is configured to generate an airflow signal based on a temperature difference across the pair of thermopiles; and an amplifier coupled to the pair of thermopiles to amplify the airflow signal from the pair of thermopiles.

8. The navigation device of claim 7, wherein each of the first and second sensors further comprises an analog-to-digital converter (ADC) coupled to the amplifier, the ADC to generate a digital signal of the amplified airflow signal, wherein the microcontroller is further configured to receive the digital signal from the ADC and to generate the two dimensional navigation signal based on the digital signal from the ADC.

9. The navigation device of claim 7, further comprising: a first heater controller coupled to the heater of the first sensor; and a second heater controller coupled to the heater of the second sensor; wherein each heater controller is configured to control current into the corresponding heater in response to a change in movement speed of the navigation device.

10. The navigation device of claim 9, wherein the first and second heater controllers comprise connections to the corresponding amplifiers, the first and second heater controllers configured to control current into the respective heaters in response to a rate of change in the airflow signals into the amplifiers.

11. The navigation device of claim 9, wherein the first and second heater controllers comprise connections to the microcontroller, the first and second heater controllers configured to control current into the respective heaters in response to output from the microcontroller.

12. The navigation device of claim 1, further comprising a surface contact sensor disposed in a bottom surface of the navigation device approximately between the first airflow director plate and the second airflow director plate, the surface contact sensor configured to determine whether the bottom surface of the navigation device is near a navigation surface.

13. The navigation device of claim 12, further comprising a switching plate coupled to the bottom surface of the navigation device, wherein the switching plate is configured to extend across the first and second airflow director plates and to extend proximal to the surface contact sensor to enable the navigation device to be used as a presentation pointer independent of the navigation surface.

14. The navigation device of claim 13, further comprising a plurality of elastic offset structures disposed in the bottom surface of the navigation device, the offset structures protruding from the bottom surface of the navigation device to be adjacent the switching plate while the switching plate is extended.

15. A method of generating navigation signals, the method comprising: converting a first airflow measured across a first sensor into a first electrical parameter, and converting a second airflow measured across a second sensor into a second electrical parameter, the second airflow measured orthogonally to the first airflow; generating a first offset and a second offset in response to an offset trigger event; and generating a first navigation signal by subtracting the first offset from the first electrical parameter, and generating a second navigation signal by subtracting the second offset from the second electrical parameter, the first and second navigation signals comprising a two dimensional navigation signal.

16. The method of claim 15, further comprising determining the first offset and the second offset while the navigation device is at rest, comprising: determining a first mean value from the first electrical parameter averaged over a first time period; determining a second mean value from the second electrical parameter averaged over a second time period; calculating a first standard deviation from a plurality of first electrical parameters; calculating a second standard deviation from a plurality of second electrical parameters; generating the first offset in response to a difference between the first mean value and the first standard deviation being greater than a first threshold; and generating the second offset in response to a difference between the second mean value and the second standard deviation being greater than a second threshold.

17. The method of claim 16, wherein the first time period and the second time period are determined by an inverse of a sampling rate of an analog-to-digital converter.

18. The method of claim 15, wherein generating the first and second navigation signals further comprises normalizing the first and second navigation signals by multiplying the first and second navigation signals by a coefficient, the coefficient being variable in response to a change in movement speed of the navigation device.

19. A navigation device for a computer, the navigation device comprising: a body comprising a base, the base defining a first opening of a first cavity and a second opening of a second cavity; a first plate within the first cavity to define a first pair of opposing arcuate openings to direct a first airflow within the first cavity, the first pair of arcuate openings having points arranged adjacent a first common axis; a second plate within the second cavity to define a second pair of opposing arcuate openings to direct a second airflow within the second cavity in a direction substantially orthogonal to the first airflow, the second pair of arcuate openings having points arranged adjacent a second common axis orthogonal to the first common axis; and a first sensor disposed within the first cavity to detect the first airflow; a second sensor disposed within the second cavity to detect the second airflow; a surface contact sensor disposed in the base approximately between the first opening and the second opening, the surface contact sensor configured to determine whether the base is near a navigation surface; and a microcontroller coupled to the first and second sensors, the microcontroller to generate a two dimensional navigation signal based on input signals from the first and second sensors.

20. The navigation device of claim 19, further comprising means for operating the navigation device as a presentation pointer independent of the navigation surface.

* * * * *